Aug. 23, 1927.
F. T. MANLEY
1,640,202
APPARATUS FOR THE DISTILLATION OF OIL
Original Filed Oct. 10, 1917
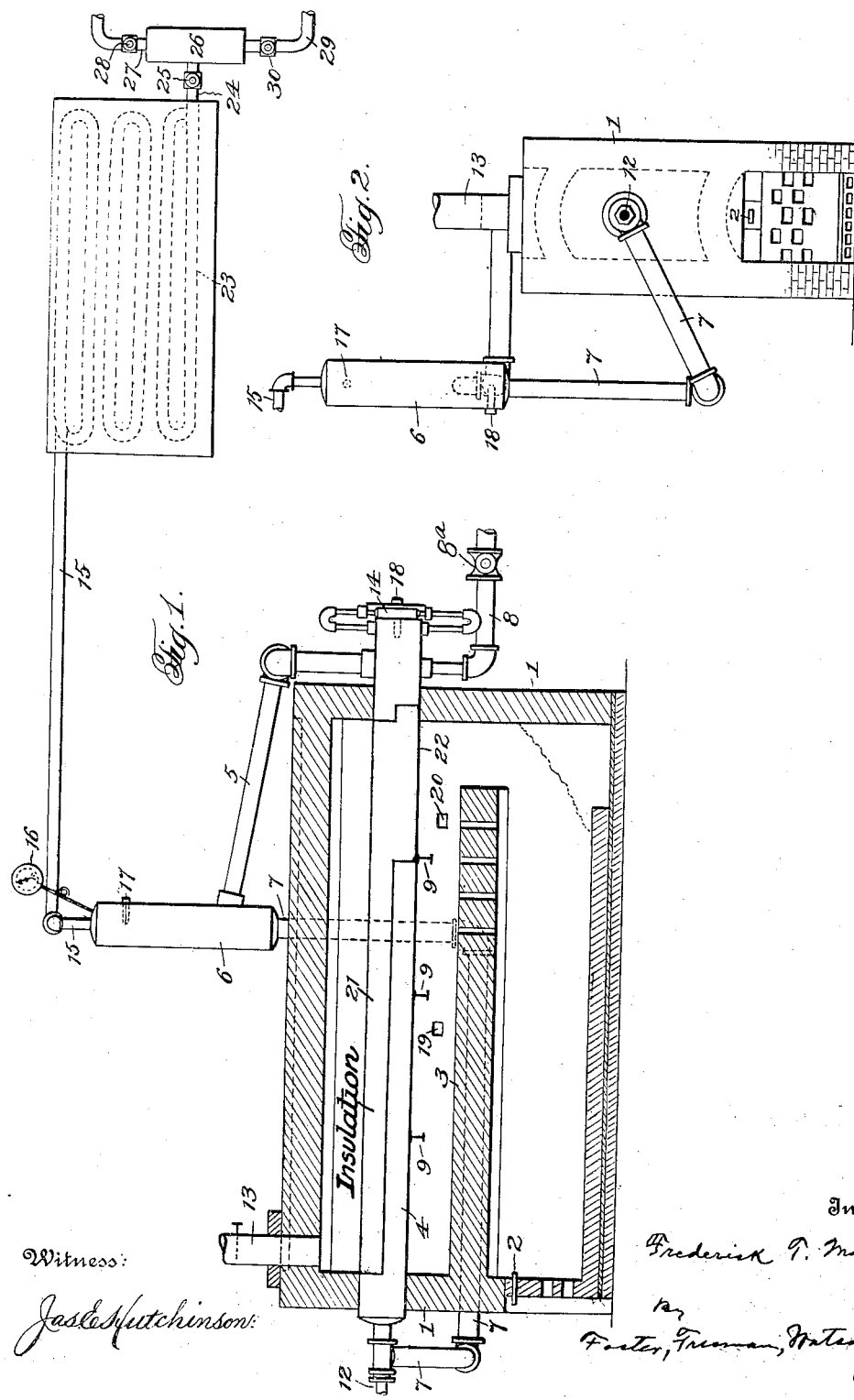
Witness:
JasEsHutchinson
Inventor:
Frederick T. Manley
by
Foster, Freeman, Watson & ...
Attorneys Patented Aug. 23, 1927.

1,640,202

UNITED STATES PATENT OFFICE.

FREDERICK T. MANLEY, OF HOUSTON, TEXAS, ASSIGNOR, BY MESNE ASSIGNMENTS, TO THE TEXAS COMPANY, OF NEW YORK, N. Y., A CORPORATION OF DELAWARE.

APPARATUS FOR THE DISTILLATION OF OIL.

Original application filed October 10, 1917, Serial No. 195,777. Divided and this application filed October 26, 1918. Serial No. 259,839.

My invention relates to a new and improved still for distilling mineral oils. It is particularly adapted for the decomposition of higher-boiling hydrocarbons into lower-boiling hydrocarbons by means of a distillation under pressure carried on in a combined liquid-vapor phase.

This application is a division of application Ser. No. 195,777, filed October 10, 1917, which matured into Patent No. 1,428,339 on September 5, 1922.

In the prior art, stills have been used which were heated only on their lower portions or along that part of the still which was covered with liquid oil, the upper part or the vapor portion being relatively cool. Stills have also been used which were heated entirely around their periphery. In stills of this type there is great danger of the vapor zone being overheated because vapor is a relatively poorer conductor of heat than liquid. My invention contemplates a still having both its liquid and vapor portions heated under such circumstances that there is substantially the same temperature in the vapor zone as in the liquid zone.

Whenever oil is heated under pressure for the purpose of carrying on its decomposition there is always a large amount of vapor generated merely through vaporization and composed of undecomposed hydrocarbons. In my improved still I have provided a novel cycle arrangement by which this vapor is allowed to go out through the vapor line at one end of the still, but is separated out and returned to the opposite end of the still, a circulation being thus carried on so that the decomposed hydrocarbons may be removed from the still and whereby the unremoved decomposed constituents are continuously circulated through the cracking zone. The vapors are kept in constant circulation within the still and are thus prevented from being overheated and causing the formation of an excess of carbon and unsaturated hydrocarbons.

The drawing illustrates the preferred form of the invention:

Figure 1 is a longitudinal section, parts being shown in plan;

Figure 2 is an end view.

Referring to the drawings the still 4 is situated in the furnace 1, which has the burner 2, the baffle wall 3, and the stack 13. The still is preferably constructed of considerable length in comparison with its diameter. It is supported by the walls of the furnace and T irons 9. At one end of the still is the vapor line 5 terminating in the separator or air condenser 6. The condensate pipe 7 extends from the air condenser to the other end of the still 4. A pipe 12 for charging the oil enters the still at any convenient point, preferably at or near the point at which the condensate pipe 7 enters the same. The valve 8ª in draw-off pipe 8 is provided for withdrawing the residue from the still. The upper periphery of the still is equipped with a heat insulating medium 21, which may be constructed of any suitable refractory material. It is designed to cover the vapor portion of the still.

Extending from the air condenser 6 is the vapor line 15 terminating in the condenser coil 23, having the outlet 24, which is equipped with the valve 25. This condenser outlet opens into the receiving drum 26, which has the gas outlet 27 fitted with the valve 28 and the condensate outlet 29 equipped with the valve 30. It is advisable to equip the still with certain accessories which I have illustrated, as the recording thermometers 17 and 18, the liquid level indicator 14, the furnace pyrometers 19 and 20, and the pressure gauge 16.

In the type of furnace illustrated, the heat arrangements are such that the heat of combustion is deflected by the baffle 3 to the rear of the furnace where it enters the chamber containing the still 4 and passes along the still imparting an even heat to the periphery thereof. It may be desirable to provide a suitable insulation 22 along that portion of the still against which the furnace gases first strike.

My apparatus is designed for carrying on an intermittent or a continuous distillation. It is particularly adapted for the continuous conversion of higher-boiling hydrocarbons into lower-boiling hydrocarbons, such as the decomposition of kerosene, gas oil, and the like into such volatile products as gasoline and naphtha. The oil to be converted is continuously forced into the still through the charging line 12. The vapors and gases generated gather in the upper portions of the still and pass out through the vapor line 5. The residue formed is drawn off by means of the outlet 8. The air condenser 6 is maintained at such temperature that the products of desired volatility remain in the vapor state therein while the heavier products are condensed and are returned to the still through the condensate line 7. The vapors and gases accumulating in the condenser 6 pass out through the vapor line 15 into the condenser 23 where the vapors are condensed. The condensate is collected in the drum 26 and may be withdrawn through the outlet 29. The permanent gases escape through the outlet 27. Pressure may be easily controlled in the apparatus by means of either the valve 25 or 28. If desired a valve for controlling the pressure may be placed in the line 15; however, the best control is secured by using either the valve 25 or 28. The condensed products accumulating in the air condenser 6 are continuously returned to the still through the condensate line 7, thus forming a continuous cycle whereby the unconverted constituents are continuously repassed through the cracking zone. The constituents returning from the air condenser are forced to travel the length of the still before they can escape into any vapor line; they are thus subjected to the cracking temperature for a sufficient time for a conversion of the greater portion into hydrocarbons of the desired volatility. The continued cycle through the cracking zone insures the ultimate decomposition of all the unconverted vapors. Without the insulation 21 the vapor portion of the still would attain a temperature considerably higher than the liquid portion causing the vapors to be overheated, and resulting in the formation of a product containing a large proportion of unsaturated compounds. By means of this insulation the conduction of heat into the vapor zone is reduced so that both the liquid and vapor portions are maintained at substantially the same temperature, or at least with only a slightly higher temperature in the vapor zone, thereby creating an even temperatured cracking zone. By means of the continual movement of the vapors maintained by the cycle arrangement and with the insulated vapor zone, the decomposition is effected with a minimum production of fixed gas and carbon. The product which is collected as a condensate in the drum 26 is, for a cracked product, remarkably sweet, in other words, low in unsaturated compounds.

Having thus described the invention what is claimed as new and desired to be secured by Letters Patent is:

1. In an apparatus for converting hydrocarbon oils, a furnace of refractory material, a still disposed therein and adapted to be partially filled with liquid oil, means for circulating the heat of combustion around substantially the entire external periphery of said still to apply cracking heat to both the vapor and liquid portions thereof and a heat insulating medium on the vapor portion of said still above the liquid level to prevent the oil vapor therein from being heated to a temperature materially higher than the liquid oil in the liquid portion and to provide a cracking zone of substantially uniform cracking temperature.

2. In an apparatus for converting hydrocarbon oils, a still adapted to be partially filled with liquid oil, means for applying cracking heat to substantially the entire external periphery of the liquid and vapor portions thereof, a heat-insulating medium disposed around the vapor portion to prevent the oil vapor therein from being heated to a temperature materially above that of the liquid in the liquid portion and means for creating a circulation of oil through the cracking zone of the still comprising a separator, a vapor outlet extending from one end of the still to said separator and a condensate line extending from said separator to the other end of the still.

3. In apparatus for converting hydrocarbon oils, a still adapted to be partially filled with liquid oil, means for applying cracking heat to substantially the entire external periphery of the liquid and vapor portions thereof, a heat insulating medium disposed around the vapor portion to prevent the oil vapor therein from being heated to a temperature materially above that of the liquid in the liquid portion, means for creating a circulation of oil through the cracking zone of the still comprising a separator, a vapor outlet extending from one end of the still to said separator and a condensate line extending from said separator to the other end of the still, means for removing from the separator the uncondensed constituents therein and condensing the condensable portions thereof and means for regulating the pressure in the apparatus.

4. In an apparatus for converting hydrocarbon oil, a still adapted to be partially filled with hydrocarbon oil during operation with a vapor space above said oil, and means for circulating a heating medium around substantially the entire external periphery of said still to bring its walls and the contained material to cracking temperatures, that portion of the walls of the still above the normal oil level being made less conductive of heat than the portion in contact with the oil to provide a cracking zone of a substantially uniform temperature.

5. In an apparatus for converting hydrocarbon oils, a still adapted to contain a body of liquid oil to be converted and having a vapor space above the level of the oil therein, and heating means constructed and arranged to supply external heat around substantially the entire periphery of both the liquid and vapor portions of the still and including a heat-insulating medium disposed upon the vapor portion thereof to maintain the oil and the vapors therein at a substantially uniform cracking temperature whereby conversion takes place in the still without overheating the vapors.

6. In an apparatus for converting hydrocarbon oil, a still adapted to contain a body of oil to be converted and having a vapor space above the level of the oil therein, means constructed and arranged to supply external heat around substantially the entire periphery of both the upper and lower portions of the still to raise the contents to cracking temperatures, means associated with the vapor portion to materially reduce the rate of heat in-put to the vapors to maintain the oil and the vapors at a substantially uniform cracking temperature whereby conversion takes place without overheating the vapors, and means for creating a cyclic circulation of oil through the cracking zone of the still to cause the unconverted constituents of the vapor to be repassed through the still whereby they are repeatedly subjected to cracking conditions.

7. In an apparatus for converting hydrocarbon oil, a still adapted to contain a body of oil to be converted and having a vapor space above the level of the oil therein, and means constructed and arranged to supply external heat around the periphery of both the upper and lower portions of the still to heat the oil to a cracking temperature, and means for preventing overheating the evolved vapors and the formation of excess carbon and unsaturated hydrocarbons, said means comprising heat insulating means associated with the upper portion of the still adjacent the vapor space and means for effecting a cyclic circulation of the unconverted constituents of the vapors through the cracking zone.

8. In an apparatus for converting hydrocarbon oils, an elongated horizontally disposed still of heat conductive material adapted to contain a body of oil and having a vapor space above the level of the oil therein, means for supplying oil to said still, a furnace for heating said still to a cracking temperature constructed and arranged to envelope said still and to pass the heat of combustion along the periphery of said still from one end to the other, means for heat insulating the upper portion of the still adjacent the vapor space to prevent overheating thereof and maintain the vapors in the vapor space at substantially the same cracking temperature as the oil whereby conversion takes place in said still, and means for removing the evolved vapors therefrom.

9. In an apparatus for converting hydrocarbon oil, a horizontal elongated still adapted to be partially filled with liquid oil and having a vapor space above the oil level, a furnace enveloping substantially the whole of said still and constructed to cause the products of combustion to pass longitudinally along the still from one end to the other while surrounding substantially the entire external periphery of both the vapor and the liquid portions thereof, and a heat insulating covering over the upper vapor portion of the still from end to end to prevent the vapors in the vapor portion being raised to a materially higher temperature than the oil in the liquid portion thereof.

In testimony whereof I affix my signature.

FREDERICK T. MANLEY.